July 12, 1966  A. B. PAGEL ETAL  3,260,184
POWER ZOOM DEVICE FOR MOVIE CAMERAS
Filed June 10, 1963  2 Sheets-Sheet 1

ARMIN B. PAGEL
HUBERT NERWIN
INVENTORS

BY R. Frank Smith
Lloyd F. Seebach
ATTORNEY & AGENT

July 12, 1966     A. B. PAGEL ETAL     3,260,184
POWER ZOOM DEVICE FOR MOVIE CAMERAS
Filed June 10, 1963     2 Sheets-Sheet 2
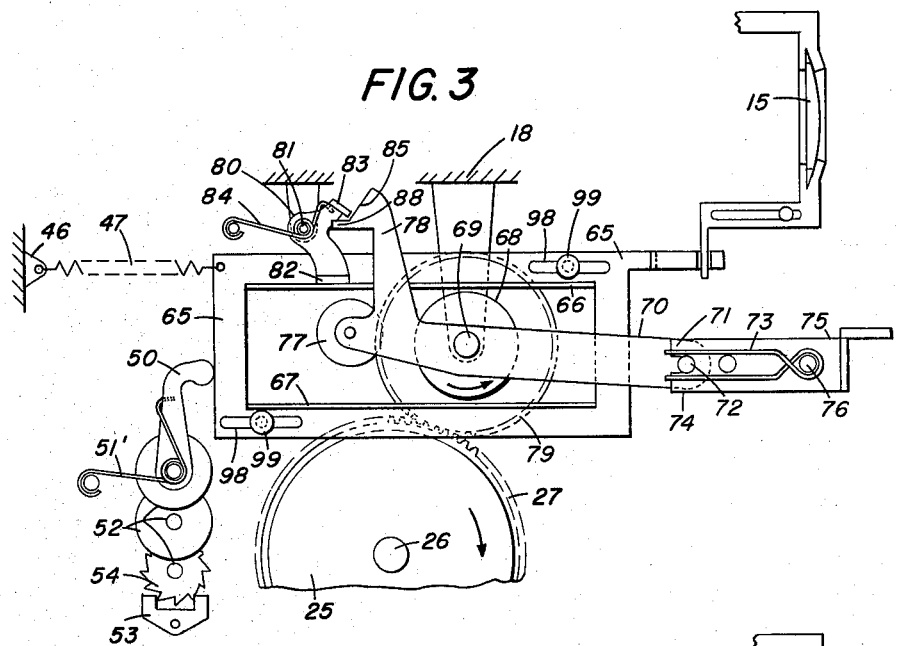
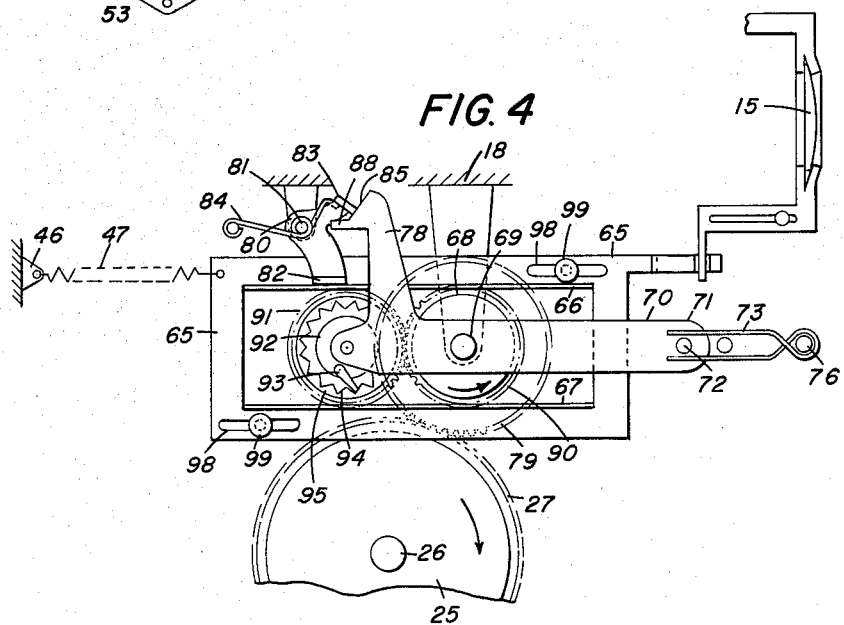
ARMIN B. PAGEL
HUBERT NERWIN
INVENTORS
BY R. Frank Smith
Lloyd F. Seebach
ATTORNEY & AGENT

United States Patent Office 3,260,184
Patented July 12, 1966

3,260,184
POWER ZOOM DEVICE FOR MOVIE CAMERAS
Armin B. Pagel, Janesville, Wis., and Hubert Nerwin, Rochester, N.Y., assignors to Eastman Kodak Company, Rochester, N.Y., a corporation of New Jersey
Filed June 10, 1963, Ser. No. 286,632
11 Claims. (Cl. 95—45)

The present invention relates to a photographic camera having a zoom or pancratic lens, and more particularly to a mechanism in which at least one lens element of the objective lens system is moved in one direction by the camera motor and in the other direction by resilient means.

In the prior art, photographic cameras having zoom lenses provide for moving the movable element of the lens system by means of a member which is coupled to the drive mechanism for moving the film strip past the exposure aperture. In the prior art, the direction of movement of the movable lens element is determined by one of two racks with which a rotatable gear member is selectively engaged, the movable lens element being driven in both directions by the same drive means. Such a system requires that a complex gear and linkage system be used in order to convert the unidirectional rotation of the camera motor to bidirectional movement of the lens element.

The present invention is disclosed in conjunction with a camera having a lens system comprising a number of lens elements with at least one of said elements being movable for varying the magnification of the lens system. The movable lens element is coupled to a member which can be moved by a camera motor for moving the lens element in one axial direction or by resilient means for moving the lens element in the other axial direction. In order to provide a uniform movement of the member coupled to the lens element, a retard mechanism counteracts the instantaneous force of the resilient means upon release of a brake member which normally holds the movable lens element against movement by the resilient means. The mechanism disclosed and described herein provides not only separate drive means for each direction of movement of the lens element, but also a uniform movement which can be arrested at any point in accordance with the desired image magnification.

The primary object of the invention is to drive the movable lens element of a zoom lens system in one axial direction by means of the camera motor and in the other axial direction by resilient means.

Another object of the invention is to provide a brake for normally preventing movement of a movable lens element in a zoom lens system and to release the brake in conjunction with driving the movable member in either of two axial directions by the camera motor and by resilient means, respectively.

Still another object of the invention is to provide a mechanism in which the camera motor drive mechanism is enabled when the movable lens element in a zoom lens system is moved in either of two axial directions by the camera motor and the resilient means, respectively.

Another object of the invention is to provide an improved power zoom mechanism for a photographic camera.

Other objects and advantages of the invention will be apparent to those skilled in the art from the description of several embodiments of the invention hereinafter described. Reference is now made to the accompanying drawings wherein like reference numerals designate like parts and wherein:

FIG. 3 is a side elevation of another embodiment of the invention in which another form of brake member and retarding mechanism is shown; and FIG. 4 is a side elevation of still another embodiment of the invention, which is similar to that shown in FIG. 3 and in which a different type of retard mechanism is incorporated.

Figure 1:
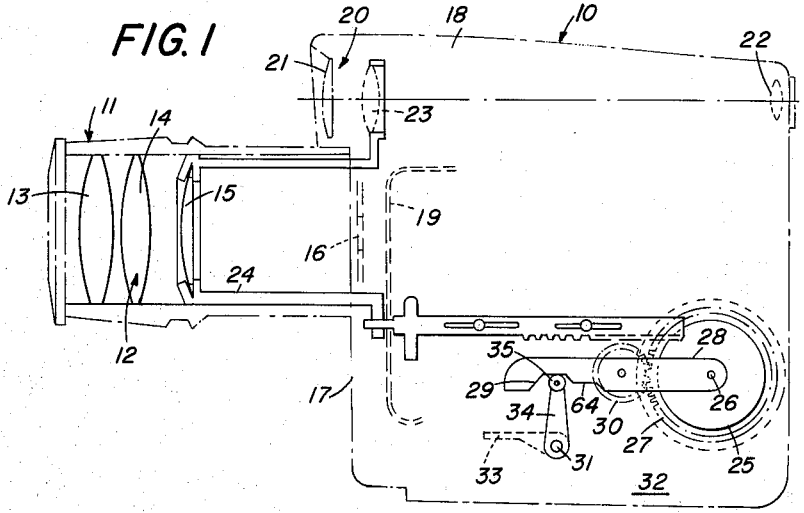
FIG. 1 is a digrammatic side elevation view of a camera showing the relationship of the zoom and viewing lens systems to the movable member coupled to the movable elements of said lens systems.
Figure 2:
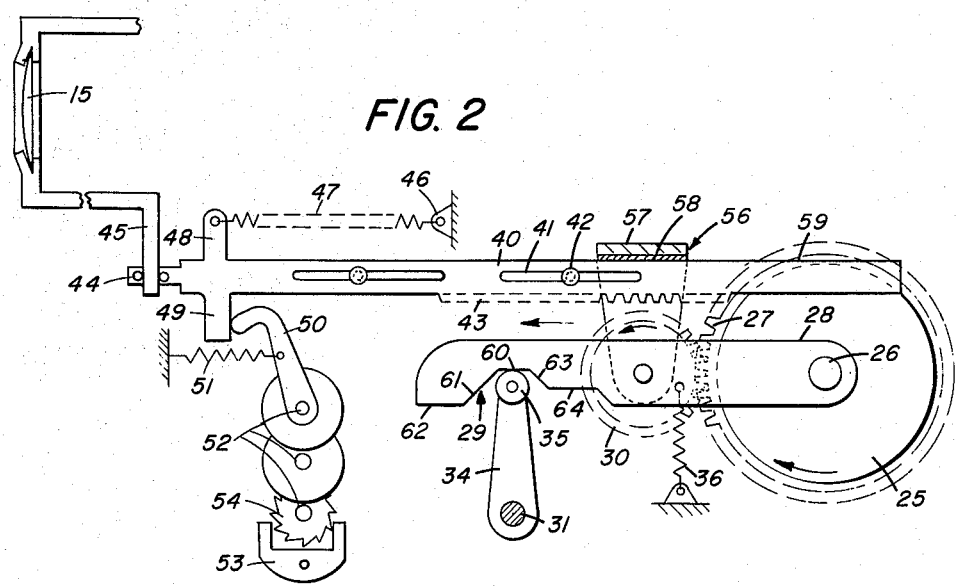
FIG. 2 is a side elevation view of one embodiment of the invention showing the arrangement for coupling the camera motor drive to the movable lens element for movement in one direction and for moving the same element in an opposite direction by resilient means.

With reference particularly to FIGS. 1 and 2, a camera 10 is provided with a lens mount 11 in which a taking lens system or objective system 12 is arranged. The objective comprises fixed lens elements 13 and 14 and a movable lens element 15, said lens elements being optically aligned and the lens element 15 being movable in either of two axial directions for varying the magnification of the taking or objective lens system. An aperture 16 is arranged in a front wall 17 of the camera casing 18 and a film strip 19 is moved past the aperture 16 in a manner well known in the art for exposing successive frames of the film strip. The camera 10 can also be provided with a viewing system 20 which comprises a fixed lens element 21, an eyepiece 22 and a movable viewing lens element 23 arranged between the element 21 and eyepiece 22. The movable elements 15 and 23 can be interconnected by a sleeve 24 for movement as a unit by the mechanism to be described hereinafter, as shown in FIG. 1; however, from the description that follows, it is to be understood that movement of lens element 15 can also include that of viewing lens element 23.

A camera motor 25 is arranged co-axially with a shaft 26 on which gear 27 is mounted for rotation by said motor. The motor 25 can be a spring-type motor or an electric motor that is energized by batteries and comprises, together with elements associated therewith, a drive means for moving the film strip 19 and for moving lens element 15 in one of its two axial directions as described hereinafter. The gear 27 can be coupled to a suitable mechanism such as shown in U.S. Patent 1,960,062 for intermittently advancing the film strip 19 in a manner well known to those skilled in the art. A lever 28 is pivotally mounted for movement about shaft 26 and at its free end, that is, the left-hand end as viewed in FIG. 2, is provided on the bottom edge thereof with a continuous cam formation 29 and intermediate said cam formation and said shaft 26 carries a gear 30 which meshes with the gear 27 and is movable about shaft 26 in a manner to be described. A shaft 31, which extends through a side wall 32 of the casing 18, carries a finger-piece or control means 33 on the exterior of the camera and a link 34 on the interior side of the camera having a roller 35 mounted on the end thereof and in engagement with the cam formation 29 which is held against roller 35 by a spring 36.

A movable member 40 is slidably mounted on the camera casing by means of a pair of spaced slots 41 and suitable studs 42 and is provided with a rack portion 43 which is aligned with the teeth of gear 30. The member 40, at its left-hand end as seen in FIG. 2, is provided with a bifurcated end 44 which engages an extension 45 forming a part of the mount 24 for the movable lens element 15. At this same end, a resilient means comprising spring 47 is connected between the extension 48 and an anchoring point 46 on the camera casing and serves to move member 40 and lens element 15 in the other of its two axial directions. Also, an extension 49 is arranged in the path of a lever 50 which, in turn, is held in engagement with said extension by a spring 51. The lever 50 forms the actuating part of a retard mechanism comprising a gear train 52 and an escapement comprising pawl 53 and ratchet 54. A brake member 55 is fixed to lever 28 and comprises a U-shaped bracket 57 having a brake material 58 which engages the top edge 59 of the member 40.

When the operator makes an exposure, the fingerpiece or control means 33 is moved in a counterclockwise direction and rotates link 34 in the same direction. The first portion of this movement releases the advancing mechanism for the film strip 19, in a manner well known in the art, without any movement of the lens element 15 due to the portion 60 of the edge cam 29. As the fingerpiece is moved farther in a counterclockwise direction, the roller 35 engages the portion 61 and causes the lever 28 to move in a clockwise direction, thereby rotating the gear 30 about gear 27 and moving gear 30 into engagement with the rack 43, the roller 35 finally engaging the portion 62 to hold gear 30 in engagement with rack 43. If the gear 27 is rotating in a clockwise direction, the gear 30 is then rotated in a counterclockwise direction and moves the member 40 to the left as well as lens element 15 until rack 43 becomes disengaged from gear 30. At the same time that gear 30 is moved toward the rack 43, the bracket 57 is moved therewith in an upward direction, thereby releasing the brake member 56 from member 40 to permit the camera motor 25 to drive the lens in a forward direction by means of gears 27 and 30 and rack 43. Since spring 51 maintains lever 50 in engagement with extension 49, the gear train 52 is wound up as member 40 moves to the left. The movement of lens element 15 can be controlled by the operator merely by returning the fingerpiece 33 to its neutral position wherein the member 40 is held by the brake member 56 against any movement to the right due to the force of spring 47. The movement of lens element 15 toward the elements 13 and 14 of the taking or objective lens system results in a telescopic effect and lens element 15 will be held in this fully forward position or some intermediate position until driven back to a normal position or to a position for obtaining a wide-angle effect.

In order to move lens element 15 rearwardly to its neutral position or a wide-angle effect, fingerpiece 33 is moved in a clockwise direction which again releases the film advancing mechanism and at the same time, pivots the lever 28 in a clockwise direction. However, the portion 63 which the roller 35 now engages does not move the lever 28 through a sufficient angle to permit gear 30 to engage rack 43, but does release the brake member 56 so as to permit movement of member 40 and the movable lens element 15 to the right by means of spring 47, lever 28 being held in this position by engagement of roller 35 with a portion 64 of cam 29. Normally, upon release of member 40 for movement by spring 47, the force exerted by said spring would cause a sharply accelerated movement of the lens element 15. However, this movement is controlled and becomes uniform due to the action of the gear train 52. As a result, upon return of fingerpiece 33 to its neutral position, the member 40 can be arrested in any desired position by member 56 by movement thereof into engagement with member 40.

From the above description, the member 40 comprises a movable member that is coupled to the lens element 15 and is adapted, upon movement of the fingerpiece 33 and link 34 in either of two directions, to move said lens elements either by means of the motor 25 or the spring 47. In a neutral position, the movement of member 40 is arrested against movement by spring 47 by the engagement of member 56 therewith.

With reference to FIG. 3, a movable member 65, which is coupled to the movable lens element 15 in a manner described above, comprises a rectangular frame having an upper drive portion 66 and a lower drive portion 67 which are in spaced, parallel relation and extend at right angles from the frame. The member 65 is slidably mounted within casing 18 for movement in either of two directions to move lens element 15 by means of a pair of slots 98 and a pair of studs 99. The slots 98 are sufficiently larger than studs 99 so as to permit a slight vertical movement of member 65 for a purpose to be described hereinafter. As in the embodiment described above, the motor 25, shaft 26 and gear 27 provide the means for driving a roller 68 which is rotatable with a gear 27 that engages gear 27, the roller 68 and gear 79 being mounted on a shaft 69 on which a lever 70 is also pivotally mounted. An end 71 of lever 70 is provided with a pin 72 which extends from both sides of said lever and is engaged on one side by a spring 73 which normally retains said lever in a neutral position and on the other side by a bifurcated end 74 of a fingerpiece 75 that is pivotally mounted for movement about a stud 76. As in the previously described embodiment, fingerpiece 75 also controls the release of the film advancing mechanism. The other end of lever 70 carries a roller 77 and is provided with an extension 78 of the shape best shown in FIG. 3. A bell crank lever 80 is pivotally mounted within the camera casing 18 at 81 and has one end 82 that carries a brake material and engages the drive portion 66. The other end 83 of lever 80 is arranged in the path of movement of the projection 88, the lever being biased toward the drive portion 66 by a spring 84. As in the embodiment described above, the spring 47 has one end anchored to the camera casing at 46 and the other end fixed to the member 65. The lever 50 and gear train 52 co-act with member 65 in the same manner as already described with respect to member 40.

In order to obtain a telescopic effect by movement of the lens element 15 in a forward direction, fingerpiece 75 is moved in a counterclockwise direction which, in turn, pivots the lever 70 in a clockwise direction and moves the roller 77 against the drive portion 66 to move the member 65 a small distance in a vertical direction so as to bring drive portion 67 into engagement with roller 68. The rotation of roller 68 and its frictional engagement with the drive portion 67 moves the lens element 15 in a forward direction and the lever 50, due to spring 51', follows the movement of member 65 to wind up the gear train 52. At the same time, a projection 88 on the extension 78 engages the end 83 of lever 80 to release the end 82 from the drive portion 66. With release of the fingerpiece 75 and its return to a neutral position by means of spring 73, the end 83 again engages the drive portion 66 to prevent movement of the lens element 15 by means of spring 47.

For obtaining a wide-angle effect by movement of the lens element 15 in a rearward direction, fingerpiece 75 is moved in a clockwise direction which, in turn, pivots the lever 70 in a counterclockwise direction and moves the roller 77 in a direction away from the drive portion 66, whereby the member 65 is not moved vertically so as to bring the drive portion 67 into engagement with roller 68. The movement of lever 70 causes the cam edge 85 to engage the end 83 of lever 80, thereby moving the end 82 away from the drive portion 66 to permit movement of the member 65 by spring 47. The movement of member 65 is continuous until the fingerpiece 75 is released so as to be returned to a neutral position by spring 73, in which case the end 82 re-engages the drive portion 66 to prevent movement of member 65 by spring 47. During the interval that the member 65 is being moved to the left by spring 47, the gear train 52 controls the movement of said member so as to provide a uniform rate of movement by means of spring 47.

The embodiment of the invention disclosed in FIG. 4 is similar to that shown in FIG. 3 with the exception of the retarding mechanism which comprises the gear train 52 as shown in FIGS. 2 and 3. The shaft 69, on which lever 70 is pivotally mounted, also carries a gear 90 which is rotatable with the gear 79. The left-hand end of lever 70 carries a gear 91 which engages gear 90 and the hub 92 thereof carries a pawl 93 which co-acts with an internal ratchet 94 formed in a roller 95 which is also rotatably mounted on the left-hand end of lever 70. When lever 70 is moved in a clockwise direction by fingerpiece 75, the roller 95 engages the portion 66 and moves the member 65 vertically so that roller 68 engages portion 67, thereby moving said member to the right. When lever 70 is moved in a counterclockwise direction by fingerpiece 75 so as to move member 65 by means of spring 47 to the left, the roller 95 engages the drive portion 67 and is rotated thereby as it is moved to the left. However, the direction of rotation of ratchet 94 is the same as that of pawl 93 which is driven by motor 25. Consequently, roller 95 can rotate no faster than hub 92 and the drive from motor 25 serves as a retard mechanism for providing a uniform rate of movement of the member 65 when it is moved to the left by means of spring 47. With movement of lever 70 in either direction, the bell crank lever 80 is engaged either by the projection 88 or edge 85 on the extension 78 to release the end 82 from engagement with the drive portion 66.

In each of the above-described embodiments, the movable member 40 or 65 is moved in one direction by means of the motor 25 and in the other direction by means of spring 47. Also, the brake means comprising member 56 or bell crank lever 80 is disengaged from its respective member 40 and 65 upon movement of lever 28 or 70 in either direction. Also, the retard mechanism is operable to control movement of the lens element 15 only when the element is being moved by means of the resilient means or spring 47. In the embodiments of the invention disclosed and described herein, the gear drive shown in FIG. 2 can be a friction drive as shown in FIGS. 3 and 4 or vice versa. Various other changes in the mechanisms described hereinabove can be made by those skilled in the art without departing from the spirit of the invention; however, the invention is not to be limited to the embodiments disclosed and described, but is of a scope as defined by the appended claims.

The embodiments of the invention in which an exclusive property or privilege is claimed are defined as follows:

1. In a photographic camera having a taking lens system including at least one axially movable lens element for varying the magnification of said lens system, drive means for moving a film strip past an exposure aperture aligned with said lens system, and manually operable control means movable from a neutral position, in which said drive means is disabled, in either of two directions for enabling said drive means, the combination comprising:
 a movable member coupled to said lens element;
 resilient means coupled to said movable member and adapted, upon movement of said control means in one of its two directions, to move said lens element in one of two corresponding axial directions;
 brake means engaging said movable member, when said control means is in said neutral position, for holding said lens element against movement by said resilient means; and
 actuating means movable by said control means for releasing said brake member from said movable member when said control means is moved in either of its two directions, and for coupling said drive means to said movable member to move said lens element in the other of said two axial directions only when said control means is moved from said neutral position to the other of its two directions.

2. A camera in accordance with claim 1 and including means for providing a substantially uniform rate of movement of said movable member and of said lens element when the latter is moved in said one of said two axial directions by said resilient means.

3. A camera in accordance with claim 2 wherein said means for providing a substantially uniform rate of movement comprises a delay gear train coupled to said movable member.

4. A camera in accordance with claim 2 wherein said means for providing a substantially uniform rate of movement comprises a ratchet carried by said actuating means and rotatable upon engagement with said movable member, when said control means is moved in the other of said two directions, and a pawl rotatably coupled to said drive means, whereby said drive means controls the rate of movement of said movable member and said lens element by said resilient means.

5. A camera in accordance with claim 1 wherein said actuating means comprises a pivotal member engageable by said control means and a rotatable member mounted on said pivotal member and coupled to said drive means, said rotatable member being moved into engagement with said movable member for moving said lens element in the other of said two axial directions only when said control means is moved from said neutral position in the other of said two directions.

6. In a photographic camera having a taking lens system including at least one movable lens element for varying the magnification of said lens system, drive means for moving a film strip past an exposure aperture aligned with said lens system, and manually operable control means movable from a neutral position, in which said drive means is disabled, in either of two directions for enabling said drive means, the combination comprising:
 a movable member coupled to said lens element and having a drive portion adapted to be engaged, upon movement of said control means in one of said directions, for moving said lens element in one of two axial directions;
 resilient means coupled to said movable member and adapted, upon movement of said control means in the other of said two directions, to move said lens element in the other of said two axial directions;
 brake means engaging said movable member, when said control means is in said neutral position, for holding said lens element against movement by said resilient means;
 actuating means including a drive member coupled to said drive means, said actuating means being movable by said control means for releasing said brake means, when said control means is moved in either of said two directions, and for moving said drive member into engagement with said drive portion to move said lens element in said one of two axial directions only when said control means is moved in said one of said two directions; and
 retarding means including a delay gear train in engagement with said movable member for controlling the movement of said movable member when it is moved by said resilient means.

7. A camera in accordance with claim 6 wherein said actuating means comprises a lever pivotally mounted intermediate its ends and including said drive member rotatably mounted on the pivotal axis thereof, one end of said lever being movable into engagement with said movable member for moving said drive portion into engagement with said drive member only when said control means is moved in said one direction, and the other end of said lever being engageable by said control means for moving said lever about said pivotal axis, and a brake actuating extension intermediate said pivotal axis and said one end of said lever.

8. A camera in accordance with claim 7 wherein said retarding means comprises an internal ratchet rotatably mounted on said one end of said lever and a pawl co-acting with said ratchet and coupled to said drive means, said ratchet being moved into engagement with said movable member, upon movement of said control means in one of said two directions, for moving said drive portion into engagement with said drive member and, upon movement of said control means in the other of said two directions, for cooperating with said pawl to control the movement of said movable member by said resilient means.

9. A camera in accordance with claim 8 wherein said movable member comprises a rectangular frame coupled to said lens element and having spaced, parallel drive portions, said drive member and ratchet being disposed between said drive portions for movement into frictional engagement therewith by said lever.

10. In a photographic camera having a taking lens system including at least one axially movable lens element for varying the magnification thereof, a viewing lens system including at least one axially movable viewing lens element for varying the magnification thereof, drive means for moving a film strip past an exposure aperture aligned with said lens system, and manually operable control means movable from a neutral position, in which said drive means is disabled, in either of two directions for enabling said drive means, the combination comprising:
   a movable member coupled to said lens element and to said viewing lens element and adapted, upon movement of said control means in either of said two positions, to move said lens elements in either of two axial directions;
   resilient means coupled to said movable member and adapted, upon movement of said control means in one of said two directions, to move said lens elements in one of said two axial directions;
   brake means engaging said movable member, when said control means is in said neutral position, for holding said lens elements against movement by said resilient means; and
   actuating means movable by said control means for releasing said brake member from said movable member, when said control means is moved in either of said two directions, and for coupling said drive means to said movable member to move said lens elements in the other of said two axial directions only when said control means is moved from said neutral position in the other of said two directions.

11. In a photographic camera having a taking lens system including at least one axially-movable lens element for varying the magnification of said lens system, the combination comprising:
   first drive means for moving said movable lens element in one of its two axial directions;
   second drive means comprising a resilient member coupled to said movable lens element for moving the latter in the other of its two axial directions; and
   manually operable control means for selectively enabling one of said drive means to move said movable lens element in a corresponding axial direction.

References Cited by the Examiner
UNITED STATES PATENTS

| | | | |
|---|---|---|---|
| 2,995,061 | 8/1961 | Briskin | 95—45 |
| 3,095,794 | 7/1963 | Raab | 95—45 |

JOHN M. HORAN, *Primary Examiner.*